(12) United States Patent
Sadovsky et al.

(10) Patent No.: US 8,713,090 B2
(45) Date of Patent: Apr. 29, 2014

(54) ENHANCING USER EXPERIENCES USING AGGREGATED DEVICE USAGE DATA

(75) Inventors: Vladimir Sadovsky, Bellevue, WA (US); Michael D. Stokes, Eagle, ID (US); Jonathan R. Schwarz, Boise, ID (US)

(73) Assignee: Microsoft Corporation, Redmond, WA (US)

( * ) Notice: Subject to any disclaimer, the term of this patent is extended or adjusted under 35 U.S.C. 154(b) by 1757 days.

(21) Appl. No.: 11/611,730

(22) Filed: Dec. 15, 2006

(65) Prior Publication Data

US 2008/0147684 A1 Jun. 19, 2008

(51) Int. Cl.
*G06F 15/16* (2006.01)

(52) U.S. Cl.
USPC .......................................... 709/203; 709/204

(58) Field of Classification Search
USPC .......................................... 709/203; 707/100
See application file for complete search history.

(56) References Cited

U.S. PATENT DOCUMENTS

| | | | |
|---|---|---|---|
| 5,056,019 A | 10/1991 | Schultz et al. | |
| 6,026,370 A | 2/2000 | Jermyn | |
| 6,298,330 B1 | 10/2001 | Gardenswartz et al. | |
| 6,298,348 B1 | 10/2001 | Eldering | |
| 6,450,407 B1 | 9/2002 | Freeman et al. | |
| 6,601,086 B1 * | 7/2003 | Howard et al. | 709/203 |
| 6,691,155 B2 | 2/2004 | Gottfried | |
| 6,838,525 B2 | 1/2005 | Pitchumani et al. | |
| 7,003,522 B1 | 2/2006 | Reynar et al. | |
| 7,107,539 B2 | 9/2006 | Abbott et al. | |
| 7,143,089 B2 | 11/2006 | Petras et al. | |
| 7,149,704 B2 * | 12/2006 | Martin et al. | 705/10 |
| 7,461,043 B2 * | 12/2008 | Hess | 706/46 |
| 7,644,422 B2 * | 1/2010 | Lu et al. | 725/9 |
| 7,689,510 B2 * | 3/2010 | Lamkin et al. | 705/51 |
| 7,831,321 B2 * | 11/2010 | Ebrom et al. | 700/87 |
| 7,890,652 B2 * | 2/2011 | Bull et al. | 709/238 |
| 2002/0022963 A1 | 2/2002 | Miller et al. | |
| 2002/0049816 A1 | 4/2002 | Costin, IV et al. | |
| 2002/0133408 A1 | 9/2002 | Walker et al. | |
| 2003/0061104 A1 | 3/2003 | Thomson et al. | |
| 2007/0192455 A1 * | 8/2007 | Motoyama et al. | 709/223 |
| 2008/0005240 A1 * | 1/2008 | Knighton et al. | 709/204 |

FOREIGN PATENT DOCUMENTS

| | | |
|---|---|---|
| JP | 2005315682 | 11/2005 |
| JP | 2006313486 | 11/2006 |

OTHER PUBLICATIONS

"Driving Mobile Content Profits", retrieved at <<http://www.motricity.com/pdf/Driving_Mobile_Content_White_Paper.pdf?PHPSESSID=f6cd7b29c72370e922e74b6b2b6b8e1c#search=%22user%20experiences%20vendor%20brand%20loyalty%20without%20advertisement%2Bpdf%22>>, May, 2005, pp. 22.

Holland, et al., "Customer Participation in Creating Site Brand Loyalty", retrieved on Sep. 26, 2006, at <<http://www3.interscience.wiley.com/cgi-bin/abstract/65513838/ABSTRACT>>, Wiley Interscience, John Wiley & Sons, Inc., 1999-2006, pp. 1-2.

(Continued)

*Primary Examiner* — Umar Cheema
(74) *Attorney, Agent, or Firm* — Carole Boelitz; Micky Minhas

(57) ABSTRACT

Enhancing user experiences using aggregated device usage data includes receiving aggregated usage data for a device, such as a computing device and/or a peripheral device. A current user context for the device is identified, and based on the aggregated usage data and the current user context an enhanced user interface is generated.

19 Claims, 7 Drawing Sheets

(56) References Cited

OTHER PUBLICATIONS

Lynch, "The Flash Platform: Delivering Effective User Experiences Across Browsers, Operating Systems, and Devices", retrieved at <<http://www.adobe.com/platform/whitepapers/platform_overview.pdf#search=%22user%20experiences%20vendor%20brand%20loyalty%20without%20advertisement%2Bpdf%22>>, Macromedia Inc., 2005, pp. 34.

The Chinese Office Action mailed Sep. 24, 2012 for Chinese patent application No. 200780046319.6, a counterpart foreign application of U.S. Appl. No. 11/611,730, 7 pages.

The Extended European Search Report mailed Feb. 21, 2013 for European patent application No. 07869396.7, 6 pages.

Kovacs, et al., "Ambient Intelligence in Product Life-cycle Management", Engineering Applications of Artificial Intelligence, Pineridge Press, Swansea, GB, vol. 19, No. 8, Nov. 6, 2006, pp. 953-965.

Magalhaes, et al., "Using MPEG Standards for Multimedia Customization", Signal Processing, Image Communication, Elsevier Science Publishers, Amsterdam, NL, vol. 19, No. 5, May 1, 2004, pp. 437-456.

Nilsson, et al., "Model-based User Interface Adaptation", Computers and Graphics, Elsevier, GB, vol. 30, No. 5, Oct. 1, 2006, pp. 692-701.

The Chinese Office Action mailed Jul. 6, 2011 for Chinese patent application No. 200780046319.6, a counterpart foreign application of U.S. Appl. No. 11/611,730, 14 pgs.

The Japanese Office Action mailed Jun. 29, 2012 for Japanese patent application No. 2009-541638, a counterpart foreign application of U.S. Appl. No. 11/611,730, 4 pages.

The Chinese Office Action mailed Feb. 22, 2012 for Chinese patent application No. 200780046319.6, a counterpart foreign application of U.S. Appl. No. 11/611,730, 9 pages.

\* cited by examiner

ENHANCING USER EXPERIENCES USING AGGREGATED DEVICE USAGE DATA

BACKGROUND

Computers have become commonplace in virtually every area of our lives. A wide variety of different computers exist and they can be configured and used in many different ways with applications, peripheral devices, and so forth. Oftentimes, during operation of the computer, something happens to which the computer could respond in different ways. For example, different actions could be taken by the computer when an application is executed, when a peripheral device is coupled to the computer, and so forth. These different actions are oftentimes presented to the user as a list of options from which he or she can select which action is to be taken. However, the user of the computer can face difficulties in selecting which action is to be taken because the user may not understand the options and/or may not understand how to communicate his or her desires to the computer. Accordingly, it would be beneficial to have a way to improve the manner in which such options are presented to the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with certain aspects of enhancing user experiences using aggregated device usage data, aggregated usage data for a device is received and a current user context is identified. Based on the aggregated usage data and the current user context, an enhanced user experience is generated.

BRIEF DESCRIPTION OF THE DRAWINGS

The same numbers are used throughout the drawings to reference like features.

DETAILED DESCRIPTION

Enhancing user experiences using aggregated device usage data is discussed herein. Device usage data for multiple devices, such as computing devices and peripheral devices, is gathered by the computing devices. The computing devices transfer the usage data to a server(s), which aggregates the usage data and sends the aggregated usage data to the computing devices. Given a current context of the computing device, the aggregated usage data, along with the current context are used to enhance the user's experience of the device(s). The user's experience can be enhanced in a variety of manners, such as selecting from a list of possible actions for the user, ordering user interface (UI) elements, adding color tagging, modifying embedded hyperlinks, and so forth.

Figure 1:
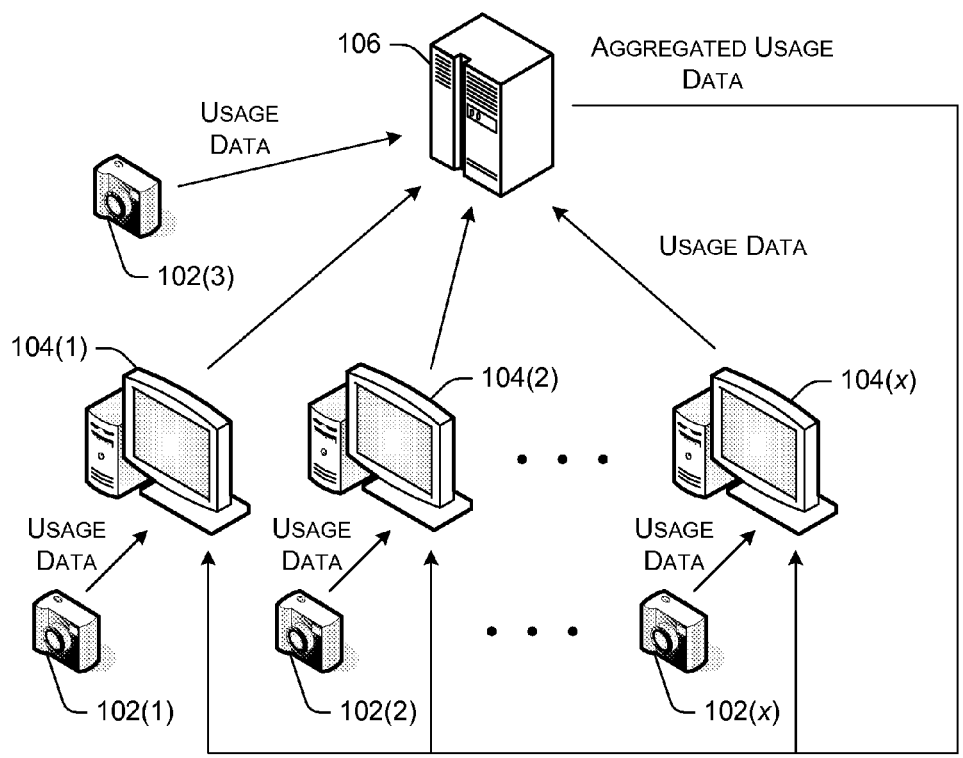
FIG. 1 illustrates an example system in which the enhancing user experiences using aggregated device usage data can be used.

FIG. 1 illustrates an example system 100 in which the enhancing user experiences using aggregated device usage data can be used. Generally, a peripheral device 102 collects usage data as the device 102 is used by the user. Peripheral devices include any of a variety of different devices that can be directly (e.g., by wired or wireless connection) or indirectly (e.g., by transfer of a flash memory card or portable hard disk) coupled to a computing device 104. Peripheral devices 102 are illustrated in FIG. 1 as being digital cameras as an example, and it is to be appreciated that devices 102 can also be other types of peripheral devices, such as camcorders, storage devices, portable music and/or video players, printers, scanners, multi-function machines, and so forth.

The collected usage data is transferred from peripheral devices 102 to computing devices 104. Computing devices 104 can be any of a variety of different types of computing devices, such as desktop computers, handheld computers, laptop computers, server computers, game consoles, entertainment systems, and so forth). In addition to the usage data collected form peripheral devices 102, each computing device 104 can also collect usage data for the computing device 104 itself as it is used by the user. This can include, for example, user selections, programs executed, interactions between the user and the computing device (e.g., by keyboard, mouse, remote control, voice commands, etc.), and so forth.

Computing devices 104 transfer this usage data to a server(s) 106. Server(s) 106 are any of a variety of different types of computing devices, and operate to aggregate the usage data received from computing devices 104. Additionally, some peripheral devices 102, such as device 102(3), may optionally upload the usage data directly to server(s) 106 rather than through a computing device 104.

Different types of peripheral devices can be coupled to different computing devices 104, and different types of peripheral devices can be coupled to the same computing device 104. Additionally, different types of computing devices can exist (e.g., laptop computers, desktop computers, and so forth). The usage data for the different types of peripheral devices and computing device is separated by server(s) 106 so that the usage data for the different types of peripheral devices and computing devices can be aggregated together by device type. In certain embodiments, server(s) 106 aggregates data together by type, vendor, and model of device. For example, digital cameras are one type of peripheral device, and they may be aggregated together by vendor and model number used by that vendor. In other embodiments, server(s) 106 aggregates data together by type without regard for model of device. For example, usage data for digital cameras may be aggregated together regardless of the vendor or model of digital camera, or usage data for notebook computers may be aggregated together regardless of the vendor or model of the notebook computer.

Additionally, an abstract device description may be used by computing devices 104 and/or server(s) 106 to store usage data for a particular type of device. This abstract device description stores usage data for the particular type of device in standard terms (e.g., the abstract device description can be a schema). Different abstract device descriptions are typically used for different types of devices. For example, for a digital camera type device, the abstract device description could include a "shutter button" element to store camera settings each time the shutter button is pressed, a "menu" element to store data describing the menu items that were selected (if any) each time the menus of the camera are accessed, a "flash" element to store data describing the setting of the camera's flash (e.g., on, off, red-eye reduction, etc.), a "pre-set" element to store data describing which pre-set exposure settings or shooting modes are selected by the user, and so forth.

Aggregation server(s) 106 also returns the aggregated usage data to computing devices 104. Returning the aggregated data to computing devices 104 allows the computing devices 104 to benefit from the usage data received by all of the computing devices. Aggregated data is created from a wide array of individualized data points of the usage data by aggregating along common factors, described in a standardized model. Data can also be aggregated across devices of different types, sharing the same abstract factors. For a given user, aggregation can be performed across different sessions of use and different devices related to the user. Further, data can be aggregated across a sampled user population to come to data points, common across multiple users. The analytical processing and deriving of final data points can be distributed between device(s) 102 and server(s) 106. This provides a broader range of data for computing devices 104 to use, as discussed in more detail below.

Computing devices 104 use the usage data as a basis for automatically enhancing the user's experience in using peripheral device 102 and/or computing device 104. The user's experience can be enhanced in a variety of manners, such as automatically selecting from a list of possible actions for the user, automatically ordering UI elements, automatically adding color tagging, automatically modifying embedded hyperlinks, automatically re-prioritizing user choices, and so forth. For example, when the user connects peripheral device 102 to computing device 104, computing device 104 can automatically select an action to be performed, computing device 104 can automatically re-order actions in a list of possible actions that could be performed so that those actions that are more likely to be desired by the user are displayed more prominently (e.g., higher in a list, in larger or different fonts, in different colors, etc.), and so forth. The usage data used by a particular computing device 104 to perform this automatic selection can be just the usage data that that particular computing device 104 has collected (either from usage of itself or peripheral devices 102 coupled to it), or alternatively can be the aggregated usage data (e.g., which was returned to computing devices 104 from aggregation server 106).

Figure 2:
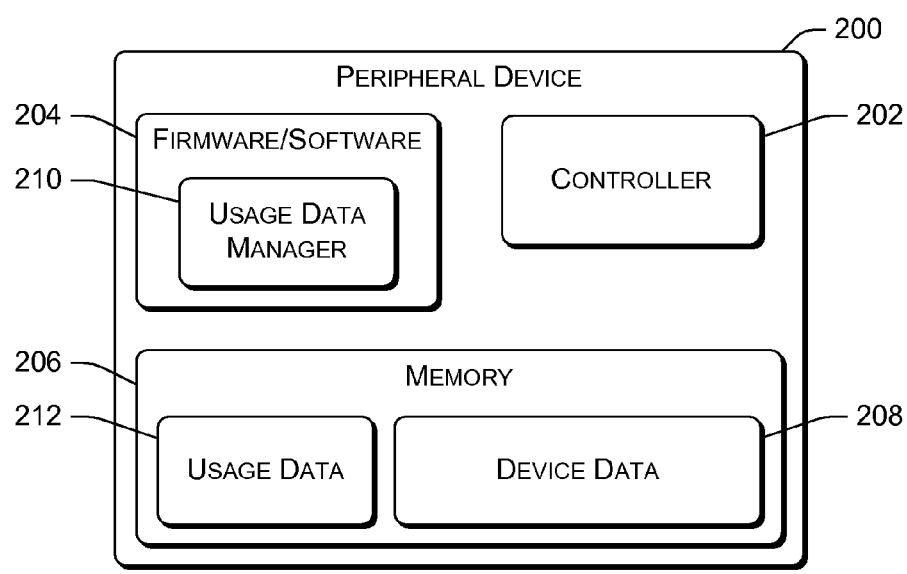
FIG. 2 is a block diagram of an example peripheral device.

FIG. 2 is a block diagram of an example peripheral device 200. Peripheral device 200 can be any of the peripheral devices 102 of FIG. 1. Peripheral device 200 includes a controller 202, firmware or software 204, and memory 206. Memory 206 includes device data 208 which is the data used by peripheral device 200 during operation (e.g., the data of pictures taken, data received to be printed or stored, and so forth). Memory 206 can include removable memory (designed to be easily removed from peripheral device 200, such as flash memory card, a portable hard drive, and so forth) and/or nonremovable memory (designed to remain within peripheral device 200).

Firmware or software 204 is a set of instructions that are executed by controller 202 in order to carry out the functionality of device 200. Although shown as being separate, firmware or software 204 can optionally be included as part of memory 206. The specific functionality will vary based on the particular type of peripheral device and the desires of the vendor of the device. Part of firmware or software 204 is a usage data manager 210. Usage data manager 210 monitors the use of device 200 and stores data describing that use as usage data 212. Any of a variety of different data can be stored as usage data 212 depending on the type of peripheral device and the desires of the vendor of the device. For example, if peripheral device 200 is a digital camera, usage data 212 can include data describing each picture taken (e.g., what the flash setting was, what the shutter speed was, whether the user overrode a default setting, and so forth), which menus the user accessed, whether the user changed any settings when accessing those menus, and so forth.

The usage data collected includes generic data collected according to a common schema and/or usage data specific to a particular vendor and/or model. For example, generic usage data such as flash setting can be collected according to a common schema for all digital cameras. By way of another example, particular menu settings for a particular vendor and/or model of digital camera can also be collected. Any usage data that is specific to a particular vendor and/or model that is returned as aggregated usage data to a computing device 104 is simply ignored by computing device 104 when enhancing the user experience for a device that is not of that particular vendor and/or model.

Figure 3:
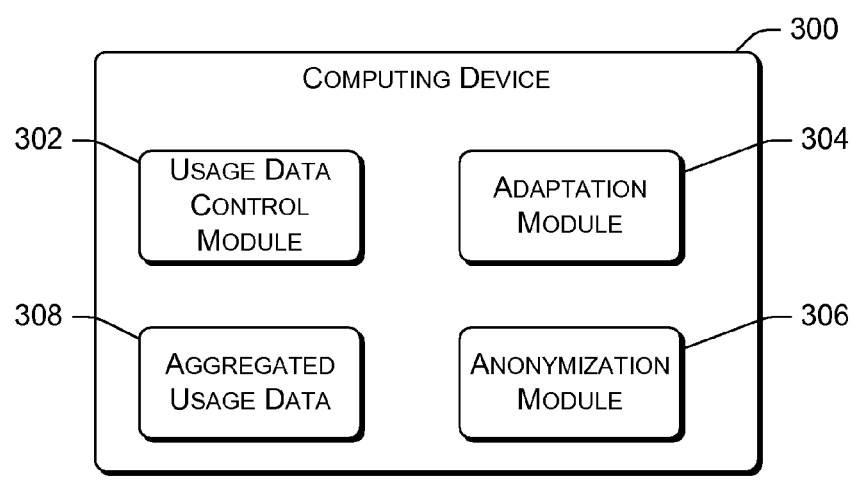
FIG. 3 is a block diagram of an example computing device.

FIG. 3 is a block diagram of an example computing device 300. Computing device 300 can be any of the computing devices 104 of FIG. 1. Computing device 300 includes a usage data control module 302, an adaptation module 304, an anonymization module 306, and aggregated usage data 308. Modules 302-306 are typically implemented using software or firmware instructions that are executed by a processor (not shown in FIG. 3).

Usage data control module 302 receives usage data from peripheral devices 102 that are coupled to computing device 300 and uploads the received usage data to the aggregation server (e.g., a server(s) 106 of FIG. 1). The manner in which the usage data is received can vary depending on the manner in which the peripheral device is coupled to computing device 300. The peripheral device may be coupled directly to computing device 300, such as by a wireless connection, IEEE 1394 cable connection, USB cable connection, and so forth. The peripheral device may also be coupled indirectly to computing device 300, such as by having a flash memory card on which data is stored removed from the peripheral device and directly coupled to computing device 300. Regardless of how the peripheral device is coupled to computing device 300, the usage data from the peripheral device is made accessible to usage data control module 302.

Additionally, in certain embodiments usage data control module 302 splits generic usage data from vendor and/or model specific usage data. Generic usage data (which is usage data common to devices of the same or different types and from different vendors and/or of different models) is used to modify the user experience when any device (or any device of that type) is used. Vendor and/or model specific usage data is used to modify the user experience only of devices of that specific vendor and/or model.

In certain embodiments, the peripheral device stores an identification of itself, either uniquely identifying itself (such as by a serial number or provisioning certificate) or generally identifying itself (e.g., by manufacturer and model number) so that usage data control module 302 can associate the received usage data with the correct type of device. This can be used as the basis for supporting separation of generic usage data from vendor and/or model specific usage data. Alternatively, the peripheral device may identify itself to computing device 300 when it is directly coupled to computing device 300. In situations where the peripheral device identifies itself by serial number, usage data control module 302 has access to a database or other record mapping that serial number to the type of peripheral device. Alternatively, this mapping may be performed by aggregation server(s) 106 of FIG. 1 rather than computing device 300. Yet alternatively mapping can be performed by "instance" data, placed into a firmware descriptor by a device vendor or firmware provider.

The received usage data may also be stored, at least temporarily, prior to being uploaded to the aggregation server. Usage data control module 302 can upload usage data 308 to the aggregation server as the usage data is received from the peripheral devices 102, or alternatively may collect usage data from multiple peripheral devices 102 (or multiple sets of usage data from the same peripheral device) prior to uploading the usage data collected from the peripheral device(s) 102. In certain embodiments, usage data can span different devices to provide combined samples of usage data. For example, separate scanner and printer measurements of "copy" usage can be provided by usage data control module 302. This type of usage data aggregation is specific to a particular computing device, although spanning multiple different peripheral devices.

Usage data control module 302 can also collect usage data regarding usage of computing device 300 and/or peripheral device 102. For example, control module 302 may collect usage data regarding a user's actions when a peripheral device 102 is coupled to computing device 300 (e.g., pictures were immediately printed, files were transferred to a hard disk, files were burned to an optical storage media (e.g., CD or DVD), and so forth). Additionally, usage data regarding a user's interactions with computing device 300 may be collected, regardless of whether a peripheral device is involved. For example, control module 302 may collect usage data regarding a user's actions when running a particular program, a user's selection of programs for execution when the computing device is started or re-started, a user's selection of particular peripheral devices (e.g., printers) as default devices, and so forth. All of this usage data, whether collected by a computing device or a peripheral device, is uploaded to the aggregation server by usage data control module 302.

The usage data uploaded to the aggregation server may or may not include personal data for the user of computing device 300 and/or peripheral device 102. Such personal data could include, for example, a serial number of the peripheral device 102 or computing device 300, a name of the user, an e-mail address of the user, other unique identifiers of the user, and so forth. What personal data, if any, is included in the uploaded usage data is determined based on inputs from the user of peripheral device 102 or computing device 300. The user can select how much personal data, if any, he or she would like disclosed by selecting a privacy level. A record of this privacy level can be maintained at computing device 300 and/or peripheral device 102. In other embodiments, computing device 300 is configured to filter or limit usage data aggregation based on centralized policies, relying on a generic identification of devices and data points.

Anonymization module 306 is optionally included in computing device 300. Anonymization module 306 removes any personal data from the usage data received from peripheral device 102 based on the user's selected privacy level. For example, if the privacy level indicates that a serial number of the peripheral device 102 and name of the user can be uploaded to the vendor, then anonymization module 306 allows the serial number and name of the user to remain in the usage data. By way of another example, if the privacy level indicates that no personal data is to be communicated to the vendor, then anonymization module 306 removes all personal data from the usage data. Alternatively, personal data may be removed by the aggregation server(s) rather than by anonymization module 306.

Computing device 300 also stores aggregated usage data 308. The aggregation server aggregates usage data received from multiple computing devices 300 for multiple peripheral devices 102 (e.g., according to an abstract schema), and returns the aggregated usage data to computing device 300 which stores the data as aggregated usage data 308. The aggregated usage data 308 is thus aggregated from multiple peripheral devices being used by multiple different users. Alternatively, computing device 300 may maintain aggregated usage data 308 as only the usage data received from peripheral devices 102 coupled to computing device 300, only the usage data collected by computing device 300 from users of computing device 300, only the usage data collected by computing device 300 from a particular user of computing device 300, the usage data received from peripheral devices 102 used only by a particular user, and so forth. This aggregation of data would be performed in the same manner as discussed below with respect to the aggregation server, although it would not be spread across as many different peripheral devices and/or users.

Aggregated usage data 308 typically includes different portions associated with different device types. Separating aggregated usage data 308 into different portions for different device models allows a more refined enhancement of the user experience of a device by adaptation module 304, as discussed in more detail below, because the different portions are associated with the different devices that may be used.

Adaptation module 304 uses aggregated usage data 308 as a basis for enhancing the user experience of computing device 300 and/or peripheral device 102 of FIG. 1. This enhancement can include, for example, automatically selecting an action from a list of possible actions for the user of computing device 300 and/or the user of peripheral device 102. For instance, when the user connects peripheral device 102 to computing device 300, adaptation module 304 automatically selects an action to be performed. This enhancement process is discussed in more detail below.

Figure 4:
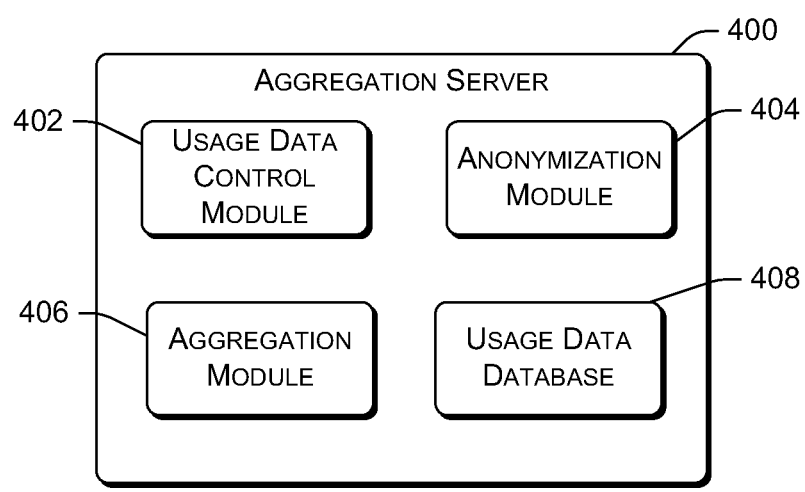
FIG. 4 is a block diagram of an example aggregation server.

FIG. 4 is a block diagram of an example aggregation server 400. Aggregation server 400 can be, for example, an aggregation server 106 of FIG. 1. Aggregation server 400 includes a usage data control module 402, an anonymization module 404, an aggregation module 406, and a usage data database 408. Modules 402-406 are typically implemented using software or firmware instructions that are executed by a processor (not shown in FIG. 4).

Usage data control module 402 receives usage data from computing devices 104 of FIG. 1. If the received usage data does not have the user's personal data removed from it, then anonymization module 404 removes the personal data in accordance with the user's selected privacy level. This privacy level is typically communicated to aggregation server 400 by the computing devices 104.

Aggregation module 406 aggregates the usage data received by usage data control module 402, and stores the aggregated data in usage data database 408. Aggregation module 406 aggregates the usage data by device type (typically by manufacturer and model). Data can also be aggregated by a generic device class. The particular device type that the usage data is associated with is typically received by aggregation server 400 along with the usage data. The aggregation of usage data for a particular device type refers to maintaining how that type of device is used across all users from which usage data is collected by server 400. This aggregated usage data can include, for example, which menu options were accessed and settings made for taking pictures, whether any exposure pre-sets were selected, what was done with data transferred to the computing device when the peripheral device was coupled to the computing device (e.g., pictures were immediately printed, files were transferred to a hard disk, files were burned to an optical storage media (e.g., CD or DVD), and so forth). All of the usage data received by aggregation server is thus combined into a single collection of usage data for each device type.

Usage data control module 402 also returns the aggregated usage data for particular device types from database 408 to the computing devices 102 of FIG. 1. Which aggregated usage data is returned to the computing device can vary. In certain embodiments, aggregation server 400 returns aggregated usage data to a particular computing device 102 for the particular device types for which server 400 received usage data from that particular computing device 102. Alternatively, aggregation server 400 may have a default collection of aggregated usage data that it sends to each computing device 102. Alternatively, computing devices 102 may request which particular usage data they want to receive (e.g., a computing device 102 may detect a new peripheral device has been coupled to the computing device, and request the aggregated usage data from server 400 for the device type of that new peripheral device).

Figure 5:
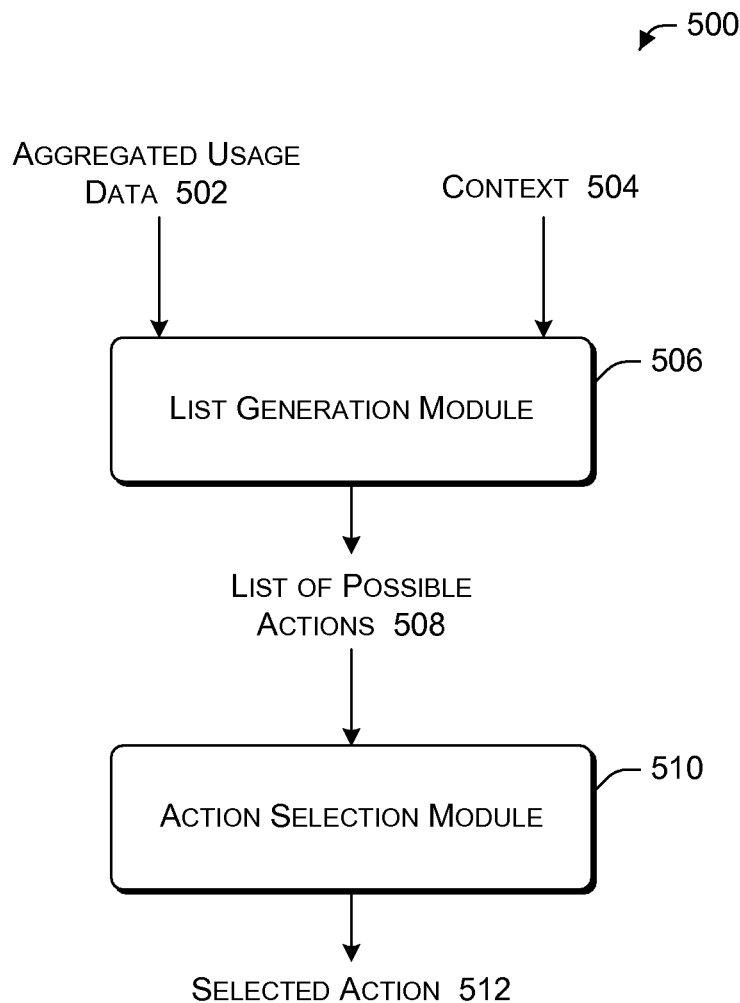
FIG. 5 illustrates an example system employing the automatic selection of an action based on a list of possible actions.

FIG. 5 illustrates an example system 500 employing the automatic selection of an action based on a list of possible actions. System 500 is implemented on a computing device, such as computing device 300 of FIG. 3. For example, system can be implemented as adaptation module 304 of FIG. 3.

System 500 can be invoked in a variety of different manners. In certain embodiments, the operating system or another application invokes system 500. In alternate embodiments, system 500 may be invoked at the request of a user. Additionally, system 500 can be invoked whenever there is a context change. The context refers to what is currently happening on the computing device implementing system 500. For example, what peripheral devices are coupled to the computing device, whether any peripheral devices have just recently been coupled to the computing device, what applications are executing on the computing device, what applications have just recently begun executing on the computing device, what applications have just terminated execution on the computing device, and so forth. In certain embodiments, system 500 is invoked whenever there is a context change (e.g., whenever an application begins execution, whenever a peripheral device is coupled to the computing device, and so forth).

Aggregated usage data 502 and a context 504 are input to a list generation module 506, which generates a list of possible actions 508. Aggregated usage data 502 is, for example, aggregated usage data 308 stored on computing device 300 of FIG. 3. Context 504 refers to what is currently happening on the computing device implementing system 500. Context 504 is typically provided by the operating system or another application that monitors the context of the computing device implementing system 500.

List generation module 506 determines, based on aggregated usage data 502 and context 504, the list of possible actions 508. Module 506 can generate the list of possible actions 508 in any of a variety of manners. Aggregated usage data 502, as discussed above, identifies the manner in which devices are used by users. For example, aggregated usage data 502 can indicate that, when a digital camera is coupled to a computing device, users either print pictures directly to a color printer, copy the pictures to a local hard drive, save the pictures on a remote storage device, or transfer the pictures to an online picture-printing service. Given this usage data, if context 504 is that a digital camera has just been coupled to the computing device implementing system 500, then list generation module 506 can generate, as the list of possible actions 508, the actions of: print pictures directly to a color printer coupled to the computing device, copy the pictures to a local hard drive of the computing device, save the pictures on a remote storage device coupled to the computing device, and transfer the pictures to an online picture-printing service.

Action selection module 510 receives the list of possible actions 508 and outputs, based on the list of possible actions 508, a selected action 512. Action selection module 510 can operate in any of a variety of different manners to determine, from the list of possible actions, which action is to be the selected action 512. Additionally, in certain embodiments, multiple actions from list 508 may be the selected action 512 (e.g., following the digital camera example above, the selected action may be both saving the pictures to a remote storage device and printing the pictures directly to a color printer coupled to the computing device).

In certain embodiments, action selection module 510 employs an artificial intelligence process to select action 512. The artificial intelligence process can learn from, for example, aggregated usage data 502. The artificial intelligence process receives aggregated usage data 502, and can learn from the behavior of the other users as reflected in aggregated usage data 502. Any of a variety of artificial intelligence processes can be used, such as an expert system, a Bayesian network, a neural network, and so forth.

Thus, system 500 automatically selects an action to be performed based on the context of the device implementing system 500 and the aggregated usage data. By using the aggregated usage data, the system benefits from the usage data collected from multiple different users. Additionally, there is typically no required learning time for a new device— it can automatically select an action based on the aggregated usage data the first time a particular context is encountered for a new user.

Figure 6:
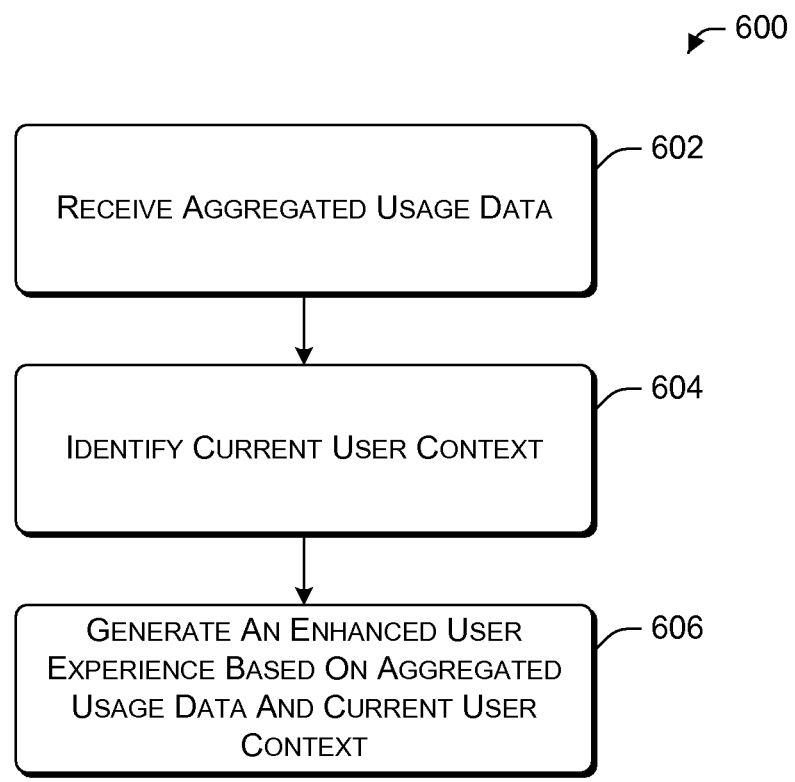
FIG. 6 illustrates an example process for using aggregated device usage data for enhancing user experiences.

FIG. 6 illustrates an example process 600 for using aggregated device usage data for enhancing user experiences. Process 600 can be carried out, for example, by an adaptation module 304 of FIG. 3, and may be implemented in software, firmware, hardware, or combinations thereof.

Initially, aggregated usage data is received (act 602). As discussed above, this aggregated usage data can be aggregated from multiple users of multiple computing devices, or alternatively from a user (or users) of a single computing device. The aggregated usage data reflects how the device was used in a variety of different contexts. The aggregated usage data can include usage data for a computing device as well as one or more peripheral devices.

The current user context is also identified (act 604). The current user context refers to what is currently happening on the device implementing process 600, as discussed above. An enhanced user experience is then generated based on the aggregated usage data and the current user context (act 606).

The enhanced user experience can take any of a variety of different forms. In certain embodiments, as discussed above with respect to FIG. 5, a list of possible actions is generated, and from the list of possible actions a most likely desired actions is selected and performed. The list of actions can be generated in a variety of different manners, as discussed above. The most likely desired action is the action that, based on the aggregated usage data and the current user context, the system implementing process 600 determines is the action that the user of the system most likely desires to occur. This is, for example, selected action 512 of FIG. 5.

Additionally, in certain embodiments, an indication of the list of possible actions generated and/or an indication of the desired action selected and performed in act 606 is sent to the aggregation server (e.g., server 106 of FIG. 1). This is additional usage data that can be communicated to the aggregation server and incorporated into the aggregated usage data by the aggregation server.

The enhanced user experience can also take other forms. For example, rather than automatically selecting and performing one of the actions in the list of possible actions, the list of possible actions may be re-ordered for presentation to the user. This re-ordering would, for example, place those actions that are determined, based on the aggregated usage data and the current user context, to be most likely desired by the user higher in the list (or otherwise more prominently in the list) than those that are determined to be less likely desired by the user.

By way of another example, the user experience may be enhanced by altering the color of certain aspects of the user interface. For example, based on the aggregated usage data and the current user context, different background or text colors may be used, different actions in the list of actions may be displayed using different colors, different highlighting colors may be selected, and so forth.

By way of yet another example, the user experience may be enhanced by altering embedded hyperlinks. For example, based on the aggregated usage data and the current user context, links can be altered to identify most likely desired data sources (such as particular help or information sources), links can be re-arranged in an order so that those links determined to be most likely desired by the user are located higher (or more otherwise prominently) than those that are determined to be less likely desired by the user.

Figure 7:
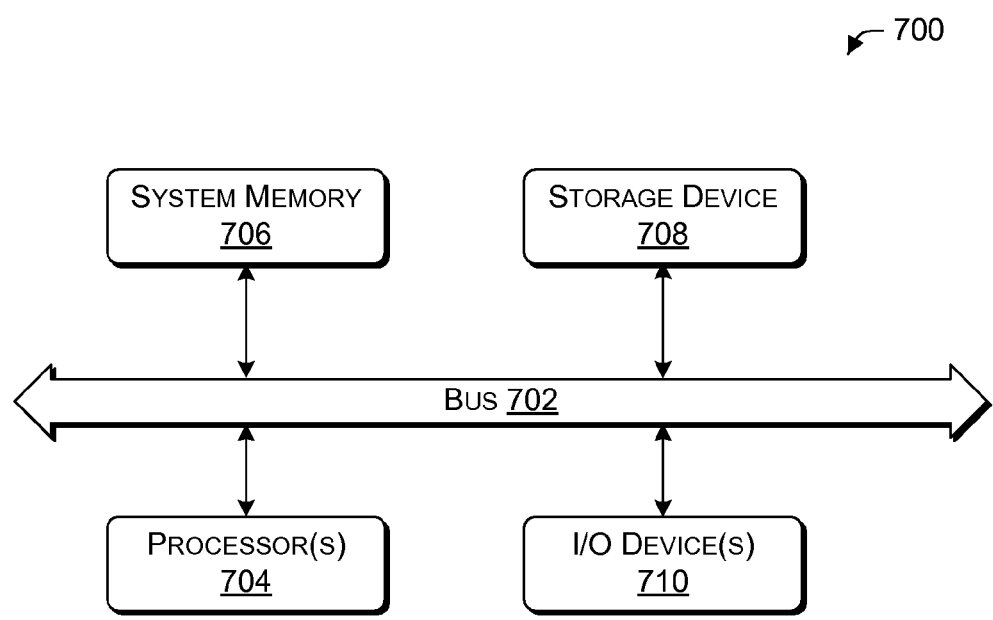
FIG. 7 illustrates an example of a general computing device that can be used to implement the enhancing user experiences using aggregated device usage data discussed herein.

FIG. 7 illustrates an example of a general computing device 700 that can be used to implement the enhancing user experiences using aggregated usage data discussed herein. Computing device 700 can be a device 104 or server 106 of FIG. 1, or a peripheral device 102 of FIG. 1. Computing device 700 is only one example of a computing device and is not intended to suggest any limitation as to the scope of use or functionality of the computing device and network architectures. Neither should computing device 700 be interpreted as having any requirement regarding the inclusion (or exclusion) of any components or the coupling or combination of components illustrated in the example computing device 700.

Computing device 700 is a general-purpose computing device that can include, but is not limited to, one or more processors or processing units 704, a system memory 706, and a bus 702 that couples various system components including the processor 704 to the system memory 706.

Bus 702 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

System memory 706 includes computer readable media in the form of volatile memory, such as random access memory (RAM), and/or non-volatile memory, such as read only memory (ROM).

Computing device 700 may also include other removable/non-removable, volatile/non-volatile computer storage device 708. By way of example, storage device 708 may be one or more of a hard disk drive for reading from and writing to a non-removable, non-volatile magnetic media, a magnetic disk drive for reading from and writing to a removable, non-volatile magnetic disk (e.g., a "floppy disk"), an optical disk drive for reading from and/or writing to a removable, non-volatile optical disk such as a CD, DVD, or other optical media, a flash memory device, and so forth. These storage device(s) and their associated computer-readable media provide storage of computer readable instructions, data structures, program modules, and/or other data for computing device 700.

User commands and other information can be entered into computing device 700 via one or more input/output (I/O) devices 710, such as a keyboard, a pointing device (e.g., a "mouse"), a microphone, a joystick, a game pad, a satellite dish, a serial port, a universal serial bus (USB), an IEEE 1394 bus, a scanner, a network interface or adapter, a modem, and so forth. Information and data can also be output by computing device 700 via one or more I/O devices 710, such as a monitor, a printer, a network interface or adapter, a modem, a speaker, and so forth.

An implementation of the document glossaries for linking to resources described herein may be described in the general context of processor-executable instructions or computer-executable instructions, such as program modules, executed by one or more computing devices. Generally, program modules include routines, programs, objects, components, data structures, etc. that perform particular tasks or implement particular abstract data types. Typically, the functionality of the program modules may be combined or distributed as desired in various embodiments.

An implementation of the document glossaries for linking to resources may be stored on or transmitted across some form of computer readable media. Computer readable media or processor-readable media can be any available media that can be accessed by a computer. By way of example, and not limitation, computer readable media or processor readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media. As defined herein, computer storage media does not include communication media.

Alternatively, all or portions of these modules and techniques may be implemented in hardware or a combination of hardware, software, and/or firmware. For example, one or more application specific integrated circuits (ASICs) or programmable logic devices (PLDs) could be designed or programmed to implement one or more portions of the framework.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more system memory or computer storage devices having stored thereon a plurality of instructions that, when executed by one or more processors, causes the one or more processors to:
   transfer data representing usage information for a user device of a user from the user device to a server, wherein the data was collected while the user device was previously used by the user, and wherein the data pertains at least in part to usage of the user device while one or more peripheral devices are coupled to the user device;
   receive aggregated usage data at the user device of the user, the received aggregated usage data being an aggregation of device usage data from a plurality of users of a plurality of devices which is based at least in part on the transferred data representing usage information for the user device of the user, the device usage data from each user of the plurality of users reflects how a respective device of the plurality of devices was previously used in a variety of different contexts;
   identify a current user context; and
   alter an aspect of the user device, based on the received aggregated usage data and the current user context, to provide an enhanced user experience.

2. One or more system memory or computer storage devices as recited in claim 1, wherein to alter an aspect of the user device, based on the received aggregated usage data and the current user context, is to:
   generate, based on the received aggregated usage data and the current user context, a list of possible actions; and
   select, from the list of possible actions, a most likely desired action.

3. One or more system memory or computer storage devices as recited in claim 2, wherein the plurality of instructions further causes the one or more processors to send an indication of the list of possible actions to a source of the current received aggregated usage data for inclusion in subsequently received aggregated usage data.

4. One or more system memory or computer storage devices as recited in claim 2, wherein the plurality of instructions further causes the one or more processors to send an indication of the selected most likely desired action to a source of the current received aggregated usage data for inclusion in subsequently received aggregated usage data.

5. One or more system memory or computer storage devices as recited in claim 1, wherein to alter an aspect of the user device, based on the received aggregated usage data and the current user context, is to:
   generate, based on the received aggregated usage data and the current user context, a list of possible actions; and
   re-order the list of possible actions so that those actions that are determined to be more likely desired by the user are presented more prominently than those that are determined to be less likely desired by the user.

6. One or more system memory or computer storage devices as recited in claim 1, wherein to alter an aspect of the user device, based on the received aggregated usage data and the current user context, is to alter one or more colors used in a user interface based on the received aggregated usage data and the current user context.

7. One or more system memory or computer storage devices as recited in claim 1, wherein to alter an aspect of the user device, based on the received aggregated usage data and the current user context, is to alter hyperlinks embedded in a user interface based on the received aggregated usage data and the current user context.

8. One or more system memory or computer storage devices as recited in claim 1, wherein the received aggregated usage data includes an aggregation of device usage data from a plurality of users of a plurality of computing devices.

9. One or more system memory or computer storage devices as recited in claim 1, wherein the plurality of devices comprises one or more peripheral devices.

10. One or more system memory or computer storage devices as recited in claim 1, wherein the instructions further cause the one or more processors to:
    receive, from a peripheral device of the one or more peripheral devices coupled to the user device, data representing usage information for the peripheral device captured during normal operation of the peripheral device; and
    transfer the data representing the usage information for the peripheral device to the server for inclusion in subsequently received aggregated usage data.

11. A system comprising: a user device including at least one processor and at least one computer-readable storage medium; the computer-readable storage medium comprising the following modules to be executed by the processor of the user device, a usage data control module configured, upon execution by the processor, to capture user device usage data representing usage data for the user device while a peripheral device is coupled to the user device and transfer device usage data to a server, wherein the transferred device usage data includes at least a portion of the captured user device usage data, a list generation module configured, upon execution by the processor, to receive aggregated usage data, from a server, and a current context, and to generate a list of possible actions based at least in part on the received aggregated usage data and the current context, the received aggregated usage data was provided by the server and is an aggregation of device usage data from a plurality of users of a plurality of devices that is based at least in part on the transferred device usage data, and an action selection module configured, upon execution by the processor, to receive the list of possible actions and select one or more actions from the list of possible actions.

12. A system as recited in claim 11, wherein the usage data control module is further configured to transfer the peripheral device usage data to the server for inclusion in the aggregated usage data.

13. One or more system memory or computer storage devices as recited in claim 1, wherein the plurality of instructions further causes the one or more processors to:
    receive peripheral device usage data from a peripheral device of the one or more peripheral devices communicatively coupled to the user device, the peripheral device usage data representing usage information for the peripheral device captured at a prior time during normal operation of the peripheral device;
    remove private information from the peripheral device usage data in accordance with a privacy level established by the user; and
    provide the server with at least a portion of the peripheral device usage data, the portion of the peripheral device usage data being free of the private information.

14. One or more system memory or computer storage devices as recited in claim 13, wherein the plurality of instructions further causes the one or more processors to:
receive user input indicative of a first privacy level associated with a first device and a second privacy level associated with a second device, and wherein remove private information from the peripheral device usage data in accordance with a privacy level established by the user comprises,
removing private information from peripheral device usage data gathered by the first device in accordance with the first privacy level established by the user, and
removing private information from peripheral device usage data gathered by the second device in accordance with the second privacy level established by the user.

15. A system as recited in claim 11, wherein the computer-readable storage medium further comprises: an anonymization module configured to remove private information from the captured user device usage data in accordance with a privacy level established by the user, wherein the transferred device usage data is free of the private information.

16. A system as recited in claim 15, wherein the user device is configured to receive user input indicative of a first privacy level associated with a first device and a second privacy level associated with a second device, and wherein the anonymization module is configured to remove private information from device usage data gathered by the first device in accordance with the first privacy level established by the user and remove private information from device usage data gathered by the second device in accordance with the second privacy level established by the user, wherein the transferred device usage data includes at least a portion of the device usage data gathered by the first device free of private information and at least a portion of the device usage data gathered by the second device free of private information.

17. A server to facilitate enhancement of user experiences for users of devices in a network, the server comprising:
at least one processor;
a computer-readable storage media having stored thereon a plurality of instructions that, when executed by one or more processors, causes the at least one processor to:
receive a privacy level from each user of a plurality of users of a plurality of devices, each user of the plurality of users establishing a respective privacy level;
receive device usage data from each user of the plurality of users of the plurality of devices;
for each user of the plurality of users, remove private information from the device usage data of the user in accordance with the privacy level of the user;
aggregate the received device usage data in accordance with the respective privacy levels of the plurality of users, wherein the aggregated device usage data is free of private information; and
provide each device of the plurality of devices with at least a portion of the aggregated device usage data.

18. The server of claim 17, wherein the plurality of instructions further causes the one or more processors to remove private information from the received device usage data from a specific user of the plurality of users in accordance with the privacy level established by the specific user, and wherein the portion of the aggregated device usage data provided to the plurality of devices is free of the removed private information.

19. The server of claim 17, wherein device usage data from each user of the plurality of users reflects how a respective device of the plurality of devices was previously used in a variety of different contexts.

* * * * *